March 7, 1933. K. C. AUGENSTEIN 1,900,377
ORNAMENTAL CHAIN
Filed Jan. 28, 1930
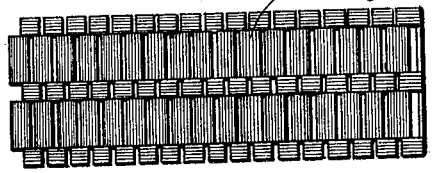
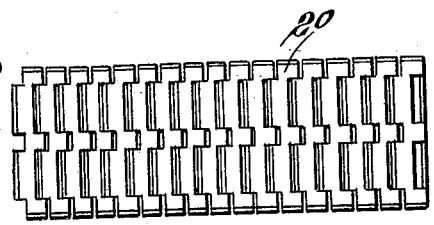
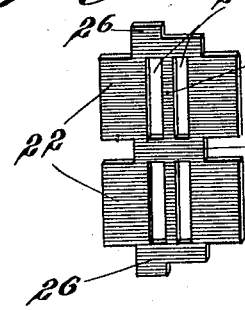
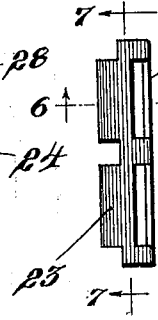
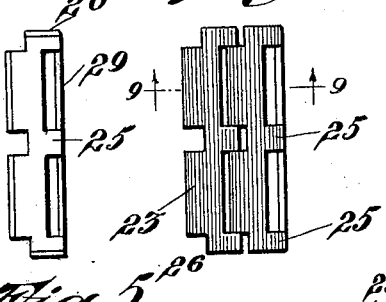
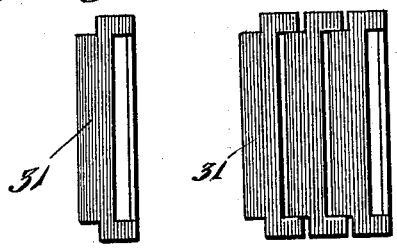
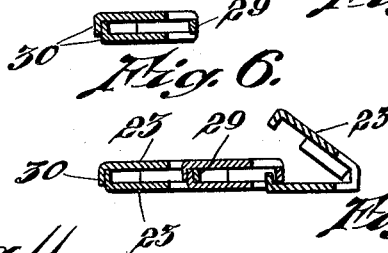
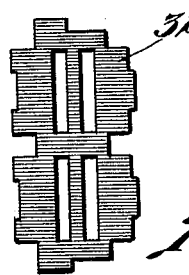
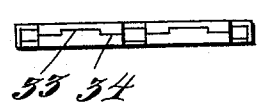
INVENTOR.
Karl C. Augenstein
BY
ATTORNEYS.

Patented Mar. 7, 1933

1,900,377

UNITED STATES PATENT OFFICE

KARL C. AUGENSTEIN, OF CRANSTON, RHODE ISLAND, ASSIGNOR TO EDWIN F. M. SPEIDEL, OF EDGEWOOD, RHODE ISLAND

ORNAMENTAL CHAIN

Application filed January 28, 1930. Serial No. 424,117.

My present invention relates to ornamental chains suitable for use in flexible bracelets, watch chain straps, and the like.

One object of my invention is to form an ornamental chain of rigid, sturdy construction from sheet metal blanks.

Another object of the invention is to utilize links of similar form which directly hingedly engage each other, thus simplifying manufacture and repair.

A further object is to form sheet metal links which will simulate staggered links of different widths when assembled to form a flexible chain.

Still another object is to strengthen the construction of links folded from sheet metal blanks by providing staggered abutting edge portions.

With these and other objects and advantageous features in view, the invention consists of novel arrangements of parts more fully disclosed in the detailed description following, in conjunction with the accompanying drawing, and more particularly set forth in the appended claims.

In the drawing:

Fig. 1 is a top plan view of the improved chain;

Fig. 2 is a bottom plan view thereof;

Fig. 3 shows a perspective view of a sheet metal blank for one link;

Figs. 4 and 5 are respectively front and rear views of a folded link;

Figs. 6 and 7 are sections on the lines 6—6 and 7—7 of Figure 4;

Fig. 8 shows two links connected together;

Fig. 9 is a section on the line 9—9 of Figure 8;

Fig. 10 shows a modified form of link;

Fig. 11 shows a section of chain formed therewith;

Fig. 12 is a plan view of a modified form of blank; and

Fig. 13 shows the staggered joindure, in a folded link formed therefrom, of the abutting edges of the side sections.

It has been found desirable in the formation of sheet metal links for ornamental chains to directly hingedly engage the links and so form the links as to simulate staggered links of varying widths; in addition, it has been found desirable to strengthen the hinge connections, either by lapping the edges of the sides when folding the links, or by abutting the edges and staggering the joint; and the following is a detailed description of constructional forms which embody the principles of my invention.

Referring to the drawing, the improved chain shown in Figure 1 is composed of links 20, which are formed from sheet metal blanks 21 as shown in Figure 3. Each blank has portions 22 which form the sides of completed link sections 23, other portions 24 of smaller size which form the sides of other link sections 25, the link sections 25 being staggered in relation to the link sections 23, and end portions 26 which fold over to cover the ends of the outer link sections 23; openings 27 are also provided to form bar portions 28 which become pivot bars 29 after the link is folded, for receiving the bent ends 30 of the side sections 23 of the next adjoining link.

In assembling the chain, each link is folded so as to bring the sides of the link sections in parallel relation, with the pivot bars 29 and the end sections 26 perpendicular thereto; the ends 30 of the side sections are now lapped over the pivot bars 29 of the adjacent link, as shown in Figure 9, to complete the assembly.

The improved chain therefore presents the appearance of staggered links of different width, this appearance being aided if desired by appropriate markings or lines on the top portions of the links; grooves may also be provided betwen contiguous link sections to simulate complete separation thereof. The lapping of the ends 30 over the pivot bars 29 results in a very strong and sturdy construction.

The use of varying heights for the staggered link sections produces pleasing and attractive designs; the smaller link sections may be formed as connecting arms joining the side sections to the transverse pivot bar, these arms preferably being laterally displaced with respect to the larger side sections.

If desired, the links may be formed in different shapes, such as shown at 31 in Figures 10 and 11, this particular form simulating the appearance of links hingedly connected together by means of a separate pivot pin.

Instead of utilizing lapped ends, it may be preferable in certain types of chains to conceal the abutting ends of the side sections, and to strengthen the joining by staggering the joint. A form of blank 32, such as shown in Figure 12, may be used for this purpose, the ends of the side sections being notched, as at 33, 34 so as to abut with a staggered joint, as shown in Figure 13, instead of lapping. This construction positions the joint on the side of the link, where it is inconspicuous.

While I have described certain constructional forms which embody the principles of my invention, it is obvious that other desired changes in arrangement, in spacing of the link sections, and in strengthening the joining of the link sides, may be made within the spirit and the scope of the invention as defined in the appended claims.

I claim:

1. An ornamental chain comprising a plurality of links, each having a pivot bar portion disposed at right angles to the length of the chain, and side sections spaced from said pivot bar portion and connected thereto by offset arms, the ends of each side section being each lapped over the pivot bar portion of the next link and over each other to hingedly lock the links in parallel relationship.

2. An ornamental chain comprising a plurality of sheet metal links, each having a pivot bar, upper and lower sections spaced from said pivot bar, and arms connecting the sections and the pivot bar, and hook portions on the upper and lower sections extending into the spaces between the pivot bar and the sections of the next link and each lapping over the pivot bar and over each other to lock the links in parallel assembled relationship.

3. In an ornamental chain, a series of sheet metal links consisting of a transverse bar, parallel superimposed side sections spaced from said bar, spaced arms connecting each side section to an edge of said bar, and portions on said side sections bent at right angles thereto and directly and hingedly engaging the transverse bar of a similar adjacent link, said portions being in overlapping relation.

4. In an ornamental chain, a series of sheet metal links consisting of a transverse bar, parallel superimposed side sections spaced from said bar, spaced arms connecting each side section to an edge of said bar, and portions on said side sections bent at right angles thereto and directly and hingedly engaging the transverse bar of a similar adjacent link, said portions having edges formed to abut in a staggered joint.

In testimony whereof I affix my signature.

KARL C. AUGENSTEIN.